June 17, 1958     G. M. VICKERS     2,839,285
HEAT TREATMENT FURNACES
Filed Nov. 24, 1954
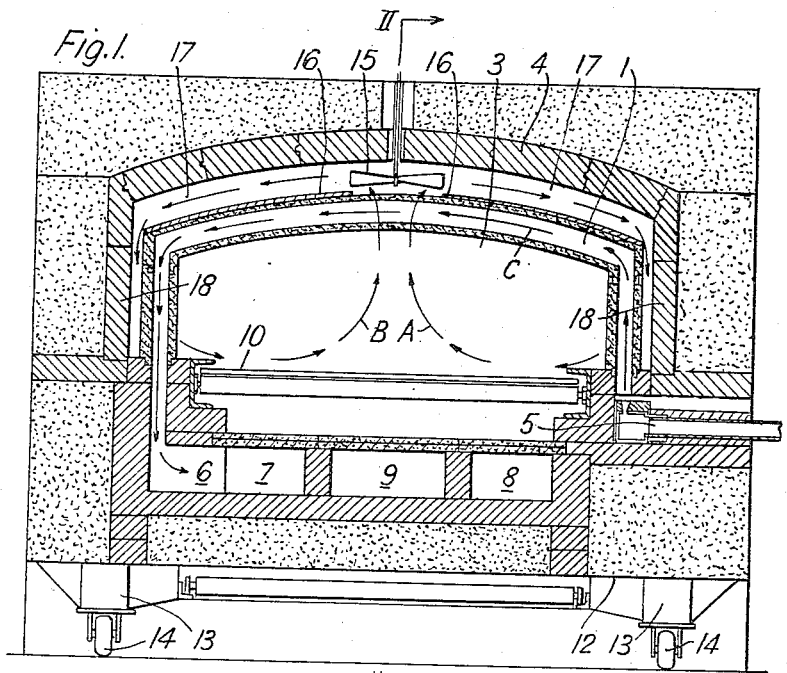
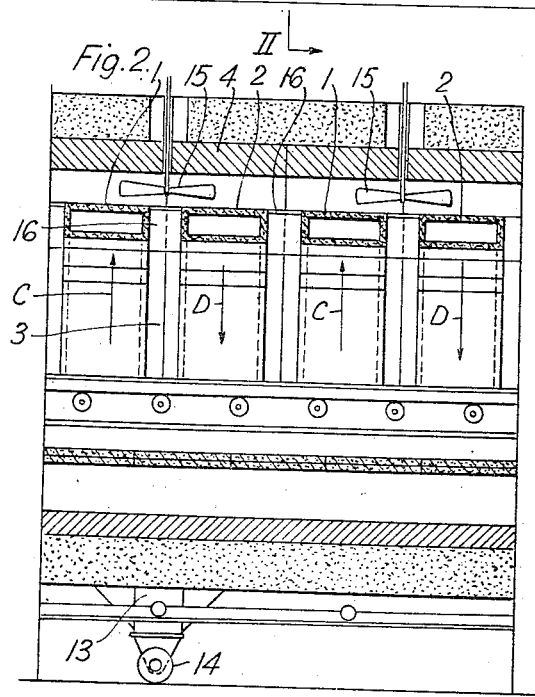
Inventor:
GEORGE MOSTON VICKERS

United States Patent Office 2,839,285
Patented June 17, 1958

2,839,285
HEAT TREATMENT FURNACES

George Moston Vickers, Cambridge, England, assignor to Vickers Furnaces Limited, Radlett, Hertfordshire, and Modern Mechanisation Limited, London, England Application November 24, 1954, Serial No. 471,058

5 Claims. (Cl. 263—42)

This invention consists in improvements in or relating to furnaces such as those employed in the manufacture of pottery, glass or enamelled ware or for annealing or other heat treatment of various goods, including metal goods, or for like purposes, of the kind in which it is known to surround the furnace chamber inside with a plurality of ducts for heating gases each extending up one side, transversely across the top and down the other side of the furnace chamber, with a conveyor having its operative run extending through the chamber, and two discharge flues for gases extending lengthwise of the chamber and below said run of the conveyor.

It is the object of the present invention both to simplify the construction of the heating means and to effect a more uniform heating of the articles passing through the furnace chamber.

Heating means according to the present invention, as applied to a furnace of the kind specified above, comprises a number of separate heat radiant tubes which are spaced along the length of the furnace chamber, each of which has its entire peripheral wall separate from the inner surfaces of said chamber throughout each of its upwardly transversely and downwardly extending portions.

Preferably heating of the radiant tubes is obtained by the use of at least one gas or oil burner situated in the entry portion of each tube, that is at the lower end of its upwardly extending portion.

Some of the tubes may be arranged to have their inlets on one side of the chamber and others on the opposite side thereof, the outlets being similarly disposed some on one side and some on the other side of the furnace chamber.

If desired a third flue may be provided between said two discharge flues to convey the products of combustion from at least one separate gas or oil burner directed into said flue, to provided additional bottom heat.

In a preferred form of the invention, the heated portion of the furnace chamber is continued into a cooling zone and curtains or baffles are arranged in the latter to prevent or minimise air circulation such as might hinder controlled cooling of the articles or materials after they have left the heated furnace chamber.

The arched radiant tubes are preferably of like cross-section, e. g. rectangular, inverted triangular or substantially semi-circular cross-section, and may be constructed of any suitable refractory material, such for instance as silicon carbide, alumina fireclay, or heat resisting metal.

The radiant tubes as aforesaid are preferably arranged along the length of the furnace and so spaced as to create the desired intensity of heat in said furnace.

According to a further feature of the invention, heating radiant tubes as aforesaid may be combined with means for effecting or enhancing circulatory flow of gases within the furnace chamber. The circulatory means, such for example as mechanically actuated rotary fans, vane wheels, centrifugal impellers or like means, may be disposed at and serve to distribute gases from the upper part of the chamber and urge the distributed gases down the sides of the chamber. Thus a central convection current may result from concentration of radiant heat tending to cause heated gases to rise at the middle of the chamber, or created or enhanced by the circulatory means, and is enabled to form two circulatory flows upwards at the middle of the chamber, in opposite directions laterally across the upper part of the chamber, downwards at the respective sides, and inwards across the bottom of the chamber.

Advantageously, the circulatory means may be disposed above the transverse upper portions of the radiant tubes and below the chamber arch or in recesses in the arch. Further, the spaces between said upper portions of the tubes, except below the circulatory means, may be covered so as to provide passages between the covers and the arch for directing the distributed gases to the sides of the chamber preferably beyond the side portions of the tubes. Thus the circulating flows of gases may serve to absorb heat from the outwardly facing parts of the tubes and carry such heat inwards to and across the bottom of the furnace chamber.

An embodiment of means according to the invention will be briefly described by way of example with reference to the accompanying diagrammatic drawing wherein:

Figure 1 is a transverse section of a furnace chamber along which passes the upper run of an endless conveyor, and Figure 2 is a section on the line II—II of Figure 1.

Arched radiant tubes 1 and 2 of rectangular cross-section as shown in Figure 2 are arranged each to extend within the interior of a furnace chamber 3 up one side of said chamber, archwise across and below the arch 4 of the chamber and down the other side of the chamber.

The alternate tubes 1 are arranged as shown in Figure 1 to have at one side of the furnace a fuel burner 5, as diagrammatically shown, of any suitable form. At the opposite side of the furnace the tubes 1 extend by way of passages 6 into a flue 7 extending longitudinally below one side of the bottom of the furnace chamber.

The intervening tubes 2 are oppositely arranged, having their burners (not shown) at the lefthand side of the furnace section (Figure 1) and opening at their right-hand vertical portions by way of passages (not shown, corresponding to passages 6) into a second longitudinal flue 8 below the furnace bottom.

Preferably, a third flue 9 is arranged below the middle of the furnace bottom, between the flues 7 and 8, to convey the products of combustion from a separate gas or oil burner directed into the flue 9, and afford additional bottom heat and better distribution of such heat.

The tubes 1 and 2 are arranged sufficiently close together along the length of the furnace chamber, as shown for example in Figure 2, to provide for uniform heating throughout said length.

The flues 7, 8 and 9 extend throughout the length of the furnace chamber and terminate in one or more stacks which, in the case of two such stacks, are conveniently arranged side by side and at the same end, i. e., the discharge end, of the furnace or the associated cooling chamber.

The upper run 10 of an endless band conveyor passes longitudinally through the furnace chamber 3 and the lower return run may be arranged to pass under the bottom 12 of the furnace structure which may conveniently be supported on vertical pillars 13 and rollers 14 to allow for expansion of the furnace structure longitudinally.

The embodiment as shown in the drawings further includes circulatory means comprising rotary impellers 15 located above the upper portions of the tubes 1 and 2 and below the furnace arch 4. These impellers, which are adapted to be rotated by suitable means upon the roof of the furnace, are disposed at intervals in the length of the furnace chamber above gaps between pairs of adjacent tubes. Preferably these gaps, except at the middle of the chamber, i. e. below or in the longitudinal zone of the impellers 15, are covered by laminar members 16 and the cover members together with the inner surface of the arch 4 constitute lateral passages 17 by which gases withdrawn from the upper part of the chamber 3 and impelled outwardly are directed to the spaces between the vertical portions of the tubes 1 and 2 and the adjacent side walls 18 of the furnace chamber. From the latter spaces the gases flow inwards across the bottom of the chamber 3. Thus, two circulatory flows, transversely of the furnace chamber, are created in the directions indicated by arrows A and B.

Uniformity of heating of the chamber is afforded by the alternate arrangement of the tubes 1 and 2, wherein the heating combustion products flow respectively in the directions indicated by the arrows C and D. Further, the circulation of gases by the impellers 15 absorbs heat from the outwardly directed surfaces of the tubes 1 and 2 and from the inner surfaces of the chamber arch 4 and sides 18, and carries such heat to articles or material passing through the chamber 3 on the conveyor 10.

I claim:

1. An annealing lehr or like furnace of the kind having a furnace chamber having inner surfaces; and a plurality of ducts for heating gases, each extending within said furnace chamber and spaced from said inner surfaces thereof up one side, transversely across the top and down the other side of said furnace chamber, a conveyor having its operative run extending through the furnace chamber and two discharge flues for the gases extending lengthwise of the chamber and below said run of the conveyor, and each of said discharge flues having an inner wall forming part of the wall of said furnace chamber, wherein each of said ducts is a heat radiant tube, which is entirely separate from the inner surfaces of said chamber throughout each of its upwardly, transversely and downwardly extending portions and in which each radiant tube is equipped with a separate burner at the lower end of its upwardly extending portion, some of said tubes being arranged to have their inlets on one side of the chamber and others on the opposite side thereof, the outlets being similarly disposed some on one side and some on the other side of the chamber.

2. A furnace according to claim 1, wherein adjacent tubes have their inlets on opposite sides of the chamber.

3. A furnace according to claim 1, having in combination means for effecting or enhancing circulatory flow of gases within the furnace chamber.

4. A furnace according to claim 3, wherein circulatory means comprising a bladed rotor are disposed above the transverse upper portions of the radiant tubes and below the chamber arch and serve to distribute gases from the upper part of the chamber and urge the distributed gases down the sides of the chamber thereby creating or enhancing two circulatory flows upwards at the middle of the chamber, in opposite directions laterally across the upper part of the chamber between the inner surface thereof and said ducts, downwards at the respective sides and inwards across the bottom of the chamber.

5. A furnace according to claim 4, and including a plurality of laminar members located between the transverse portions of the radiant tubes and forming passages between the transverse portions of said tubes and the under-surface of the arch whereby the distributed gases are directed to the sides of the chamber so that the circulating flows of gases serve to absorb heat from the outwardly facing parts of the tubes and carry such heat inwards to and across the bottom of the furnace chamber.

References Cited in the file of this patent

UNITED STATES PATENTS

| | | |
|---|---|---|
| 1,195,641 | Batchell et al. | Aug. 22, 1916 |
| 2,086,971 | Wilson et al. | July 13, 1937 |
| 2,513,597 | Taylor | July 4, 1950 |

FOREIGN PATENTS

| | | |
|---|---|---|
| 379,729 | Great Britain | Aug. 31, 1933 |
| 576,853 | Great Britain | Apr. 23, 1946 |